Sept. 4, 1956      C. C. HALLING      2,761,156

AUTOMATIC SCREW SLOTTING ATTACHMENT FOR TURRET LATHES

Filed Sept. 23, 1955

INVENTOR.
CALEB C. HALLING
BY
McMorrow, Berman & Davidson
ATTORNEYS

United States Patent Office 2,761,156
Patented Sept. 4, 1956

2,761,156

AUTOMATIC SCREW SLOTTING ATTACHMENT FOR TURRET LATHES

Caleb C. Halling, Angelica, N. Y.

Application September 23, 1955, Serial No. 536,219

4 Claims. (Cl. 10—5)

This invention relates to attachments for turret lathes, and more particularly to a screw severing and head slotting attachment for a screw forming turret lathe.

A main object of the invention is to provide a novel and improved automatic screw slotting attachment for turret lathes and similar machines, the attachment being simple in construction, being easy to mount on a turret lathe, and providing a great saving in the time and cost involved in severing screws formed on a turret lathe and forming slots in the heads thereof.

A further object of the invention is to provide an improved automatic screw slotting and severing attachment for turret lathes to replace the rear cutoff tool holder on the cross slide formerly employed, the improved screw severing and head slotting attachment being inexpensive to manufacture, being reliable in operation, and eliminating the necessity of slotting the head of a screw formed on the laths by a separate operation performed on a different machine, such as a milling machine, as has been previously the practice.

Further objects and advantages of the invention will become apparent from the following description and claims, and from the accompanying drawings, wherein:

Figures 1, 2:
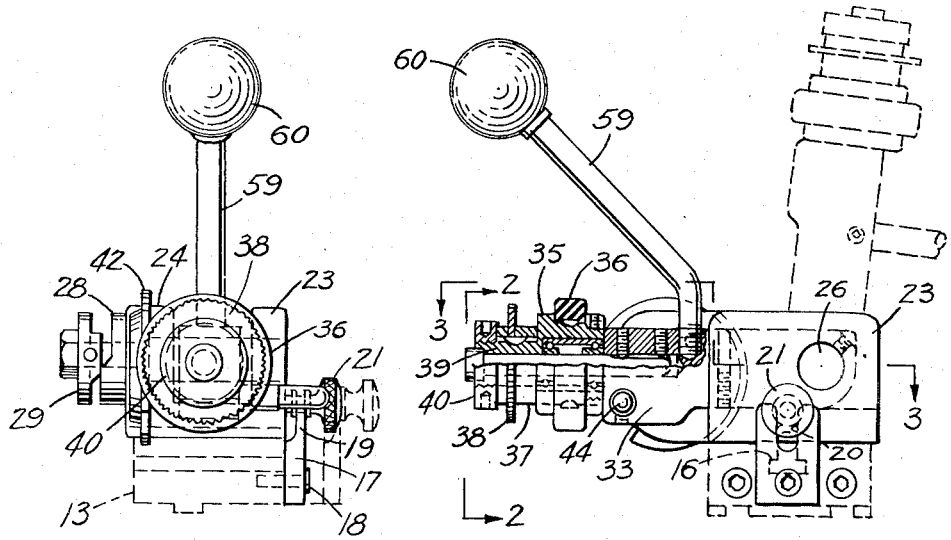
Figure 1 is a side elevational view, partly in vertical cross section, of an improved automatic screw slotting and severing attachment for a turret lathe, constructed in accordance with the present invention.
Figure 2 is an end elevational view of the attachment of Figure 1, taken on the line 2—2 of Figure 1.

Referring to the drawings, 11 generally designates a conventional turret lathe having the turret 12 and the cross slide carriage 13 extending transverse to the lathe bed 14. Ordinarily, a rear cutoff tool holder is mounted on the cross slide carriage 13 and a screw forming tool is employed in the turret 12 to form the screw on the lathe. When the screw is formed by the tool on the turret lathe, the thread is put on the screw by a suitable die element held in the turret. The screw is cut off by the cutoff tool on the cross slide carriage 13. After the screw is cut off, it is picked up manually and taken to a different machine, such as a milling machine, for the purpose of slitting the head of the screw. This involves not only a separate operation but a more costly process than if the screw could be fabricated and slotted on the same machine and by the same operator.

In accordance with the present invention, the previously employed rear cutoff tool holder is replaced by an attachment comprising a base element 15 which is generally channel shaped and which is fastened to the carriage 13 in any suitable manner. For example, the base member 15 may be formed with a T-shaped rib 16 adapted to interengage with a T-shaped groove formed transversely in the carriage member 13 and to be rigidly locked to the carriage 13 by a bracket plate 17 secured to the side edge of the carriage member 13, as by a bolt 18 extending through the lower portion of the bracket plate 17 and threadedly engaging in the carriage member 13. The bracket plate 17 is formed with the reduced top portion 19 having the vertical notch 20 therein. Engaged in the notch is a fastening screw 21 which is threadedly engaged in the side portion of the base member 15, the screw member 21 being rotatably positioned in the notch 20 by spaced collar elements 22 provided on the shank of screw 21, as is clearly shown in Figure 4. Thus, the base member 15 may be readily unfastened by disengaging the screw 21 therefrom and then moving the base member 15 laterally, to disengage the T-shaped rib 16 from the T-shaped groove in the carriage member 13. Alternatively, the screw 21 may be disengaged from the base member 15 after the bolt 18 is unthreaded from carriage member 13. When the bolt 18 is unfastened from the carriage member 13, the base member 15 may be moved laterally to disengage the T-shaped rib 16 from the carriage member 13, and if so desired, the screw member 21 may be employed as a handle to accomplish this, as shown in dotted view in Figure 2.

Figures 3, 4:
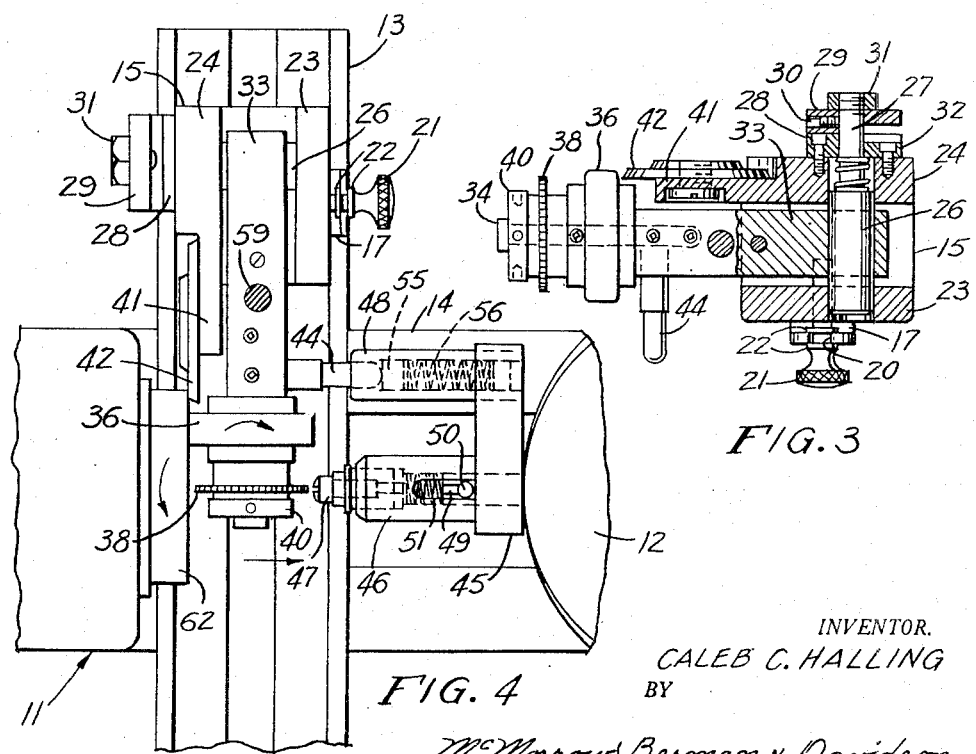
Figure 3 is a cross sectional view taken on the line 3—3 of Figure 1.
Figure 4 is a fragmentary top plan view of a portion of a turret lathe provided with an improved screw severing and head slotting attachment in accordance with the present invention, the attachment being the same as that shown in Figures 1, 2 and 3.

The base member 15 is formed with the upstanding side walls 23 and 24, said side walls being formed with transversely aligned apertures in which is slidably positioned a transverse shaft member 26 having a reduced end portion 27. Designated at 28 is a stepped cam disc which is secured to the exterior surface of wall 24 around the reduced portion 27 of shaft 26. A cooperating cam disc 29 surrounds the reduced portion 27 of shaft 26 adjacent the cam disc 28, the cooperating portion 29 being also stepped, as shown in Figure 2, for camming cooperation with the cam step on the disc 28. Disc 29 is rigidly secured to the reduced shaft portion 27 by a set screw 30. A lock nut 31 is threadedly engaged on the end of reduced shaft portion 27, as shown in Figure 3. A coiled spring 32 surrounds the inner portion of the reduced shaft element 27, bearing between the main enlarged portion of shaft 26 and the disc 28, biasing shaft 26 inwardly, namely, in a downward direction, as viewed in Figure 3.

Rigidly secured to the shaft 26 is a spindle arm 33 which extends parallel to the walls 23 and 24 and which is normally closely adjacent to the wall 23 but which is movable toward the wall 24 responsive to the camming interengagement of the steps on the discs 29 and 28, so that the spindle arm 33 is movable closely adjacent to the wall 24 when the step on the cam disc 30 rides up on the step on the cam disc 28, as shown in Figure 2.

Longitudinally secured to the arm 33 is the spindle shaft 34. Rotatably mounted on the spindle shaft 34 is a sleeve 35 on which is secured a friction wheel 36. Also secured to sleeve 35 is a further sleeve 37 carrying the saw disc 38. As shown in Figure 1, the sleeve 37 is engaged on a reduced portion 39 of the main sleeve 35 and is keyed against rotation with respect thereto. A fastening collar 40 is secured on the reduced portion 39 and retains the sleeve 37 on said reduced portion.

The wall 24 is formed with an arm 41 on which is secured the cutoff disc 42, which is similar to the conventional cutoff tool ordinarily employed to sever the screw after the thread is formed thereon by the die held in the turret 12.

Rigidly secured to the arm 33 and projecting laterally therefrom is a guide pin element 44. Designated at 45 is an aligning and screw-holding bracket member which is engageable in one of the socket elements of the turret 12 and which may be thus supported on the turret 12 in the manner illustrated in Figure 4. Thus, the bracket member 45 may be provided with a conventional shank portion engageable in the socket of the turrent 12. Secured to the bracket member 45 is a sleeve element 46 formed to receive the shank portion of a screw formed on the lathe, for example the screw shown at 47 in Figure 4 when the screw is severed from the screw stock rod. Secured to the bracket member 45 parallel to the sleeve 46 is a second sleeve member 48 adapted to slidably receive the guide pin 44, as shown in Figure 4, to properly align the slotting disc 38 with the head of the screw 47 to form the required slot therein, as is illustrated in Figure 4.

The sleeve member 46 is provided with suitable means to frictionally receive the shank of the screw 47, for example, an inner rubber lining, or the like, and with means for ejecting the screw after the screw head has been slotted, for example, an ejecting plunger 49 engageable with the inner end of the screw shank, said plunger being provided with an upstanding operating handle 50 projecting through a slot 51 provided in the sleeve 46. The plunger element 49 is biased forwardly by a suitable spring means, for example, a coiled spring surrounding the plunger element and bearing on a collar provided thereon, whereby the end of the plunger element 49 is engaged with the inner end of the screw shank so that the screw may be ejected by exerting relatively light ejecting force on the upstanding handle member 50.

As shown in Figure 4, the guide pin member 44 engages a follower block element 55 slidably positioned in the sleeve 48, the follower block element 55 being biased outwardly by a suitable coiled spring 56 provided in the sleeve 48 and urging the follower member 55 outwardly, to assure contact of said follower member with the end of the guide pin element 44 when said guide pin element is inserted in the sleeve 48.

Rigidly secured to the arm 33 is the upwardly extending inclined handle rod 59 provided on its top end with the handle ball 60, for rotating arm 33. While the screw thread is being formed, the arm 33 is in an inoperative upstanding position, as shown in dotted view in Figure 1. As above explained, when the screw is formed by the front tool on the lathe turrent 12, the thread on the screw is formed thereon by a die held in the turret. The screw may then be severed by the cutting disc 42 on the base member 15. The bracket member 45 is, of course, previously mounted on the turret 12 and the screw is received in the sleeve element 46 thereof when it is cut off. After the screw is received in the sleeve 46, the turret is moved away from the nose cap 62 of the lathe, after which the arm 33 is rotated from the dotted view position thereof of Figure 1 to a substantially horizontal position, wherein the pin element 44 may be engaged in the sleeve 48. At the same time, the rotation of the shaft 26 causes the cam disc 29 to engage with the cam disc 28 so as to move the shaft 26 and arm 33 from wall 23 toward wall 24, whereby the friction wheel 36 is drivingly engaged with the rotating nose piece 62 of the lathe to cause sleeve 35 and the saw disc 38 to rotate. The sleeve 48 is then engaged with the pin 44 in the manner shown in Figure 4, whereby the head of the screw 47 is suitably aligned with the rotating saw disc 38. The turret 12 may then be moved toward the rotating saw disc 38 to form the required slot in the head of screw 47. After the slot has been formed in the screw head, the turret is backed away, and the arm 33 is returned to its inoperative, dotted view position, shown in Figure 1, whereby the above described operation may be repeated for the next screw.

While a specific embodiment of an improved screw slotting and severing attachment for a turret lathe has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A screw severing and head slotting attachment for a screw-forming turret lathe comprising a base element adapted to be mounted on the cross feed support of a lathe, a bracket member engageable in a turret of the lathe, means on the bracket member formed and arranged to supportingly receive the shank of a screw formed on the lathe, a transverse cutting blade on said base element, a spindle arm pivoted to said base element for movement from an upstanding position to a horizontal position thereon, a sleeve rotatably mounted on said spindle arm, a friction drive wheel on said sleeve, means moving said friction drive wheel into engagement with the nose cap of the lathe spindle at a point offset from the center of said nose cap to drive said sleeve responsive to movement of said spindle arm to said horizontal position on said base element, and a slotting saw disc mounted on said sleeve in a position which is in alignment with said shank-receiving means on the bracket member when said spindle arm is in said horizontal position.

2. A screw severing and head slotting attachment for a screw-forming turret lathe comprising a base element adapted to be mounted on the cross feed support of a lathe, a bracket member engageable in a turret of the lathe, means on the bracket member formed and arranged to supportingly receive the shank of a screw formed on the lathe, a transverse cutting blade on said base element, a spindle arm pivoted to said base element for movement from an upstanding position to a horizontal position thereon, a sleeve rotatably mounted on said spindle arm, a friction drive wheel on said sleeve, a slotting saw disc mounted on said sleeve in a position which is in alignment with said shank-receiving means on the bracket member when said spindle arm is in said horizontal position, and cooperating cam means on said base element and spindle arm moving said friction disc into frictional driving engagement with the nose cap of the lathe spindle at a point offset from the center of said nose cap responsive to the movement of said spindle arm to said horizontal position on said base element.

3. A screw severing and head slotting attachment for a screw-forming turret lathe comprising a base element adapted to be mounted on the cross feed support of a lathe, a bracket member engageable in a turret of the lathe, means on the bracket member formed and arranged to supportingly receive the shank of a screw formed on the lathe, a transverse cutting blade on said base element, a spindle arm pivoted to said base element for movement from an upstanding position to a horizontal position thereon, a sleeve rotatably mounted on said spindle arm, a friction drive wheel on said sleeve, a slotting saw disc mounted on said sleeve in a position which is in alignment with said shank-receiving means on the bracket member when said spindle arm is in said horizontal position, cooperating cam means on said base element and spindle arm moving said friction disc into frictional driving engagement with the nose cap of the lathe spindle at a point offset from the center of said nose cap responsive to the movement of said spindle arm to said horizontal position on said base element, and interengageable positioning means on said spindle arm and bracket member.

4. A screw severing and head slotting attachment for a screw-forming turret lathe comprising a base element adapted to be mounted on the cross feed support of a lathe, a bracket member engageable in a turret of the lathe, means on the bracket member formed and arranged to supportingly receive the shank of a screw formed on the lathe, a transverse cutting blade on said base element, a spindle arm, means supporting said spindle arm for pivoting movement from an upstanding position to a horizontal position on said base element and for lateral movement on said base element, a sleeve rotatably mounted on said spindle arm, a friction disc wheel on said sleeve located so as to be positioned adjacent a point on said nose cap offset from its center when the spindle arm is in said horizontal position, a slotting saw disc mounted on said sleeve in alignment with said shank-receiving means when said spindle arm is in said horizontal position, and cooperating cam means on the base element and spindle arm moving said spindle arm laterally and moving said friction disc into frictional driving engagement with said point of the nose cap responsive to movement of said spindle arm to said horizontal position on said base element.

References Cited in the file of this patent
UNITED STATES PATENTS

| | | |
|---|---|---|
| 280,296 | Curtis | June 26, 1883 |
| 2,651,239 | Schlagel | Sept. 8, 1953 |